United States Patent [19]

McClive

[11] Patent Number: 5,039,979
[45] Date of Patent: Aug. 13, 1991

[54] ROADWAY ALARM SYSTEM

[76] Inventor: Ralph T. McClive, 88 Knowlton Ave., Buffalo, N.Y. 14217

[21] Appl. No.: 507,730

[22] Filed: Apr. 11, 1990

[51] Int. Cl.⁵ .......................... B60Q 1/00; G08G 1/09
[52] U.S. Cl. .................... 340/438; 340/436; 340/901; 340/905
[58] Field of Search ............... 340/438, 436, 437, 439, 340/575, 901, 905; 362/153.1

[56] References Cited

U.S. PATENT DOCUMENTS

| | | | |
|---|---|---|---|
| 2,520,305 | 8/1950 | Campbell | 340/437 |
| 2,911,635 | 11/1959 | Ross | 340/905 |
| 3,044,043 | 7/1962 | Wendt | 340/905 |
| 3,575,255 | 4/1971 | Wickstrom | 340/905 |
| 3,996,556 | 12/1976 | Eigenmann | 362/153.1 |
| 4,143,264 | 3/1979 | Gilbert et al. | 340/905 |
| 4,348,652 | 9/1982 | Barnes et al. | 340/905 |

Primary Examiner—Donnie L. Crosland

[57] ABSTRACT

A method of providing metallized painted divider lines on paved highways so that drivers will be alarmed of moving out of their lane if sleepy or intoxicated when a sensor comes into the metal field.

1 Claim, 1 Drawing Sheet

ROADWAY ALARM SYSTEM

BACKGROUND AND STATEMENT OF OBJECT

The problem of drivers drifting into other lanes when sleepy or under the influence of alcohol or drugs result in many fatal accidents due to head on collisions with oncoming cars. The purpose of this procedure is to provide an interior noise alarm that will alert someone unknowingly changing lanes.

BRIEF DESCRIPTION OF THE DRAWINGS

How the foregoing object of reducing driver drift from one lane to another will be accomplished will appear more fully from the following.

DETAILED DESCRIPTION

Figure 1:
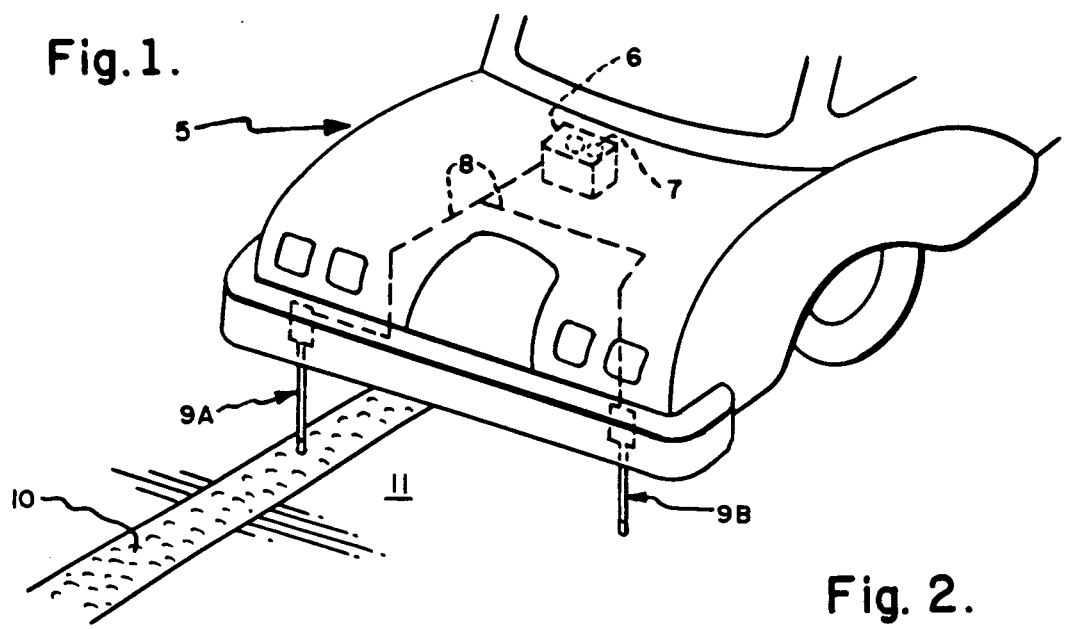
FIG. 1, is a drawing of an automobile, truck, van or motor vehicle equipped with metal sensors driving over a highway marked with painted or plastic divider lines containing metal in some form, said vehicle containing a sensor wiring system and alarm.
Figure 2:
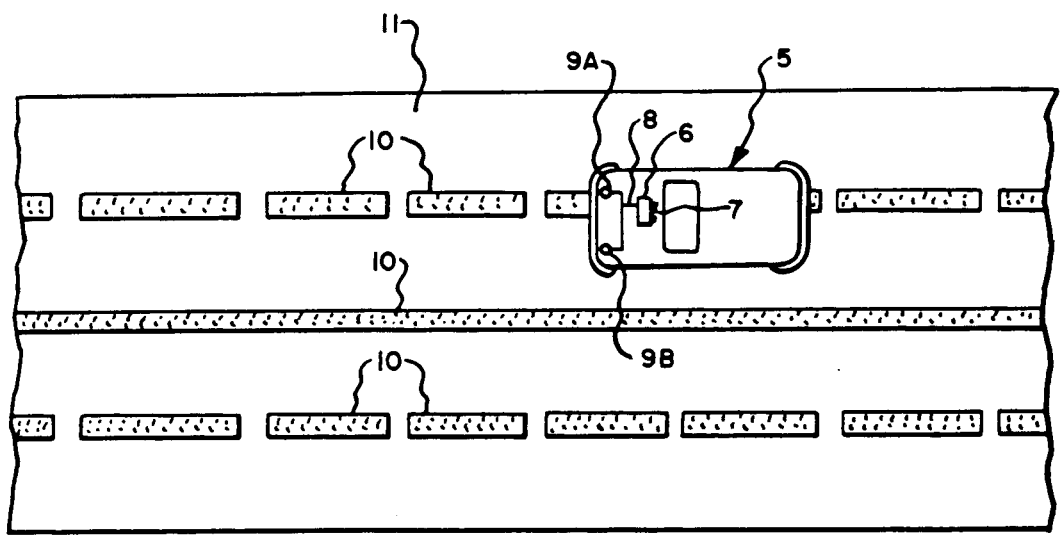
FIG. 2, shows a sensor activating a metal strip or painted lines containing metal pellets, metal, powdered metal shavings or metal wire fragments. Some highways use plastic tape for markings and a continuous wire could be placed under these tapes.

In FIG. 1, vehicle 5 has an alarm box 6 wired to a control box 7 that is wired 8 to a flexible proximity sensor 9A or 9B. When this sensor moves into the field of the metalized impregnated painted or plastic strip 10 secured to highway 11, it sends a message to the alarm box 6 which produces an alarm noise within the vehicle warning to the vehicle occupants that a change in lanes is eminent. The alarm box and proximity sensor may be electrically coordinated with the turning signal lever to show their intent and also eliminate the buzzer alarm sound which would sound if they did not use their turn signal lever. This means that a person not fully aware of their intent because of fatigue or alcohol or drug influence, would be startled by the buzzer alarm sound and possibly move back into their proper lane.

Figure 3:
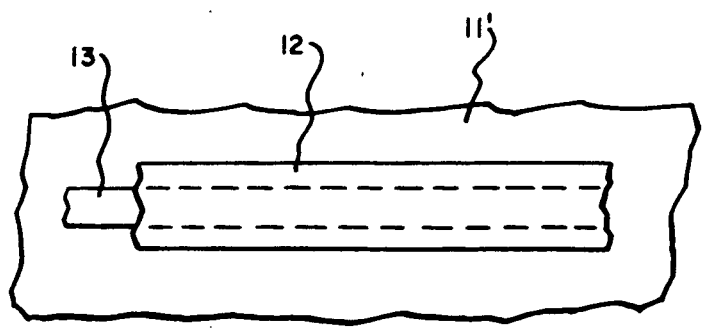
FIG. 3, shows a highway marked with a sensor activating metal wire under a plastic tape.

FIG. 3 includes a highway 11' marked with a sensor activating metal wire 13 under a plastic tape 12.

What is claimed is:

1. A roadway alarm system that alerts vehicle occupants of a lane change, comprising a metallized impregnated painted or plastic strip marked on a highway to distinguish lanes; sensor means mounted on a vehicle for detecting metal impregnated into the paint when said sensor means come into proximity with said metallized impregnated painted or plastic strip; alarm means connected to said sensor means and activated when said sensor means comes into proximity with said metallized impregnated painted or plastic strip, thereby providing a warning to the vehicles occupants that a change in lanes is eminent.

* * * * *